Oct. 27, 1970 JAMES E. WEBB 3,537,103
ADMINISTRATOR OF THE NATIONAL AERONAUTICS
AND SPACE ADMINISTRATION
SERIAL DIGITAL DECODER
Filed Aug. 15, 1967 4 Sheets-Sheet 1

INVENTOR.
RICHARD R. GREEN
BY
ATTORNEYS

RICHARD R. GREEN
*INVENTOR.*

*BY* [signature]
[signature]
ATTORNEYS

RICHARD R. GREEN
*INVENTOR.*

BY

ATTORNEYS

FIG. 6

| CH RATE PULSE | STATE OF CB1 | STATE OF CB2 | STATE OF SWITCHES 34A, 42A | STATE OF SWITCHES 34B, 42B | CH AT 35A | INPUT OF 32A | OUTPUT OF 32A | OUTPUT OF 36A | OUTPUT OF 38A | CH AT 45A | INPUT OF 32B | CHARACTERS IN 32B | OUTPUT OF 32B | OUTPUT AT 45B |
|---|---|---|---|---|---|---|---|---|---|---|---|---|---|---|
| 1 | 1 | 0 | A | B | a | a | — | — | — | — | — | — | — | — |
| 2 | 0 | 1 | B | A | b | a – b | a | a + b | a – b | a+b | a+b | a + b | — | — |
| 3 | 1 | 1 | A | A | c | c | a – b | — | — | a–b | a–b | a – b ; a+b | — | — |
| 4 | 0 | 0 | B | B | d | c – d | c | c + d | c – d | c + d | a+b-(c+d) | a+b-(c+d) ; a – b | a + b | a+b+c+d |
| 5 | 1 | 0 | A | B | — | — | c – d | — | — | c – d | a-b-(c-d) | a-b-(c-d) ; a+b-(c+d) | a – b | a-b+(c-d) |
| 6 | 0 | 1 | B | A | — | — | — | — | — | — | — | a – b – (c – d) | a+b-(c+d) | a+b-(c+d) |
| 7 | 1 | 1 | A | A | — | — | — | — | — | — | — | — | a-b-(c-d) | a-b-(c-d) |

RICHARD R. GREEN
*INVENTOR.*

BY
[signature]
[signature]
ATTORNEYS

United States Patent Office
3,537,103
Patented Oct. 27, 1970

3,537,103

SERIAL DIGITAL DECODER

James E. Webb, Administrator of the National Aeronautics and Space Administration, with respect to an invention of Richard R. Green, Pasadena, Calif.

Filed Aug. 15, 1967, Ser. No. 660,843
Int. Cl. G06f 5/00
U.S. Cl. 340—347 10 Claims

ABSTRACT OF THE DISCLOSURE

A decoder for decoding a message encoded with a code word from a square ($2^n \times 2^n$) symmetrical matrix with entries of +1 and −1. The decoder consists of a sequence of $n$ substantially identical stages with each stage including a serial memory of a different storage capacity which can be expressed as $m=2^P$, where P is an integer including zero (0), the maximum value of P being equal to $n-1$.

ORIGIN OF INVENTION

The invention described herein was made in the performance of work under a NASA contract and is subject to the provisions of Section 305 of the National Aeronautics and Space Act of 1958, Public Law 85–568 (72 Stat. 435; 42 USC 2457).

BACKGROUND OF THE INVENTION

Field of the invention

This invention generally relates to a decoding circuit and, more particularly, to a serial digital decoder.

Description of the prior at

The use of encoding techniques in data communication to minimize the effect of noise on the accuate identification of tansmitted data is well-known, particularly by those familiar with the art of space communication. Briefly, data to be transmitted is first encoded by a code which may be thought of as consisting of a word in a code dictionary definable as a matrix. The result is an encoded message which is then transmitted.

Upon reception, the encoded message is decoded by correlating it with each of the words in the code dictionary in order to retrieve the original data. Such a technique may be thought of as matrix decoding. As the data to be transmitted increases or gets larger, as is the case when the data is digital in character, the code size increases, in turn increasing the matrix size. As a direct result of the increase in the size of the matrix, the decoder's complexity increases while reducing the speed with which the decoding can be accomplished.

Various theories and techniques have been investigated to reduce the complexity of the decoder and for increasing the maximum bit rate at which the decoder can operate. The results of one such investigation have been published in an article entitled "Decoding Techniques for Block-Coded Digital Communication Systems," by M. A. Koerner in Jet Propulsion Laboratory Space Programs Summary No. 37–17, vol. 4, pages 71–73. Briefly, in the Koerner article, it is suggested that the decoding problem may be simplified by breaking down a primary square symmetrical matrix of +1 and −1 entries into simpler identical matrices, each of which is the root matrix of the primary matrix. It is further suggested to successively operate on the code message with these root matrices, as will be exemplified hereafter in order to highlight the distinguishing features of the present invention over the prior art.

Such a technique, though producing certain advantages, is still quite difficult to implement, since for each root matrix operation, a specialized different type logic circuit must be designed. This greatly increases the physical complexity of any decoder which is to operate in accordance with such teachings. Such teachings actually require the use of a general purpose computer with relatively large data storage capacity which is expensive. Thus a need exists for a decoder which can be implemented with minimal complexity irrespective of code length and one which can perform the decoding operation at a sufficiently high decoding speed.

OBJECTS AND SUMMARY OF THE INVENTION

Accordingly, it is a primary object of this invention to provide a decoder which overcomes the disadvantages of the prior art.

Another object is the provision of a digital decoder which is easily implementable irrespective of the code length.

A further object of the invention is the provision of a serial digital decoder which requires a memory size which does not exceed the number of characters in the encoded message.

Still a further object of this invention is to provide a modular type serial digital decoder of standard logic design functioning as a maximum likelihood exhaustive search decoder.

Yet a further object is to provide a relatively simple decoder for a message encoded with a code from a square symmetrical matrix of $2^n \times 2^n$ code words.

These and other objects of the invention are achieved by providing a serial digital decoder consisting of $n$ substantially identical stages or modules. Each module includes a serial memory of a different character storage capacity.

The stages forming the decoder of this invention are based on the mathematical analysis that the square symmetrical matrix of $2^n \times 2^n$ hereafter also referred to as the primary matrix is capable of being resolved into a product of dissimilar root matrices. Each stage performs the multiplication operation on each character of the coded message operated upon by preceding stages. As a result, the output of the last stage of the decoder is a succession of products of the coded message by the various words of the code dictionary or primary matrix.

The novel features that are considered characteristic of this invention are set forth with particularity in the appended claims. The invention will best be understood from the following description when read in connection with the accompanying drawings.

BRIEF DESCRIPTION OF THE DRAWINGS

FIG. 6 is a summary of the output and switching arrangement of a 2-stage decoder.

DESCRIPTION OF THE PREFERRED EMBODIMENTS

Figure 1:
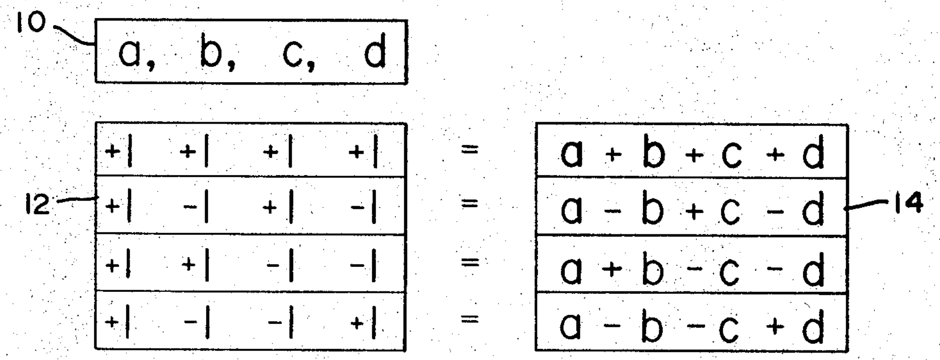
FIG. 1 is a diagram of an encoded 4-character message and the required decoding by a square symmetrical matrix with +1 and −1 entries.
Figure 2:
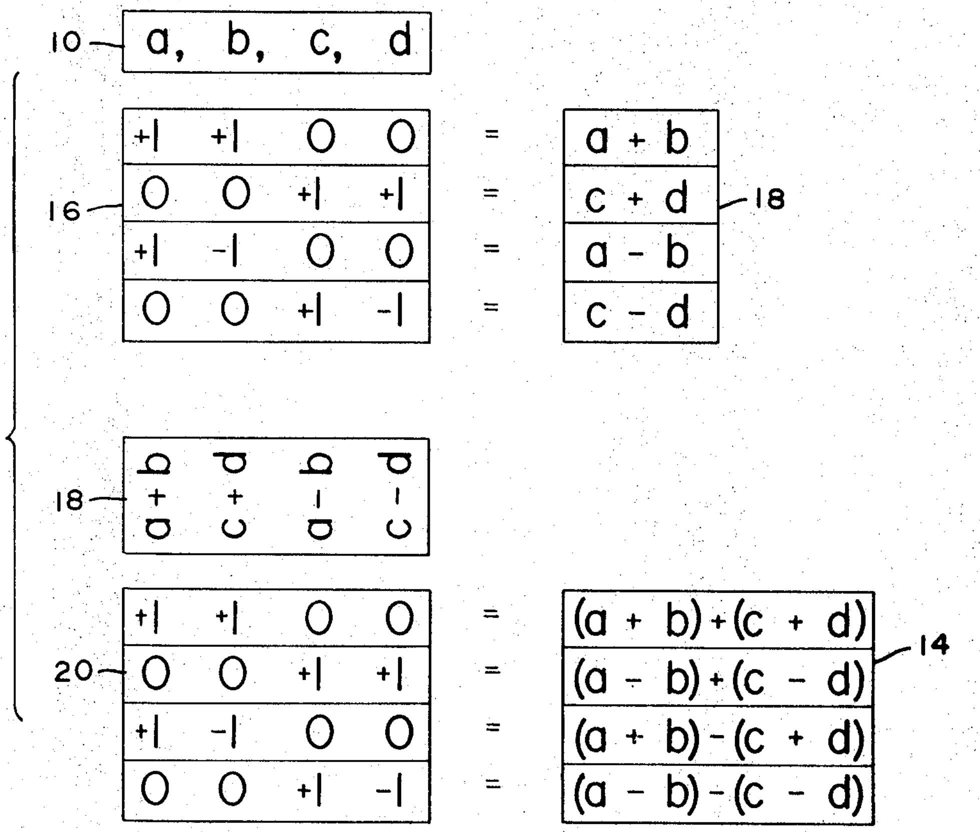
FIG. 2 PRIOR ART
FIG. 2 is a decoding arrangement suggested in a prior art technique.

For a better explanation and understanding of the basic principles of operation on which the novel decoder of this invention is based, reference is first made to prior art decoding techniques described in conjunction with FIGS. 1 and 2. In FIG. 1, block 10 represents a multicharacter received encoded message which is to be decoded. In the example, message 10 is shown consisting of $2^2$ characters, *a*, *b*, *c* and *d*, each assumed to represent a multibit digital number.

The message is assumed to have been encoded by a code or word out of a square symmetric $2^n \times 2^n$ matrix with the entries of +1 or −1 such as enclosed in block 12 of FIG. 1. The general matrix being $H_n$, defined by $H_n = H_{n-1} \otimes H_1$ where $$H_1 = \begin{bmatrix} 1 & 1 \\ 1 & -1 \end{bmatrix}$$

and ⊗ denotes the Kronecker Product. As is appreciated by those familiar with the art, the operation of a decoder consists of multiplying the message 10 by each of the codes or rows of the matrix in block 12. A search is then performed between the resultant correlation values. The largest value indicates the most likely word to have been transmitted. In FIG. 1, the products produced by a decoder are represented in the four rows in block 14.

It is apparent that even with a relatively simple four by four matrix, a large number of multiplication, addition and comparison operations must be performed. Such performance could only be accomplished by a highly complex, special purpose decoder or by a general purpose computer, the latter having been usually resorted to in the past.

As previously briefly stated, theories and techniques have been investigated to reduce the complexity of a decoder needed to perform the decoding of a message by searching a code dictionary or a square symmetrical matrix as shown in block 12. The aforementioned article of M. A. Koerner is one example of such attempts. Briefly, Koerner suggests the breaking up of the square symmetrical matrix, hereafter symbolized by $H_n$ into *n* root matrices $R_n$. That is, $H_n = R_1 . R_2 \ldots R_n$ and the decoder would correlate the incoming encoded message with each word in the first root matrix $R_1$ and the results of such correlation would then be correlated with each word of a succeeding root matrix. Defining the decoder's required operation as *y* and the encoded message as *x*, the relationship may be mathematically expressed as $$y = H_{nx} \quad (1)$$

In accordance with Koerner's suggestion, the operation may be expressed as $$y = R_n[\ldots\ldots\{R_3[R_2(R_1 \times)]\}\ldots] \quad (2)$$

In the above expression $R_1 = R_2 = R_3 = \ldots R_n$.

The manner in which a decoder, in accordance with Koerner's theory, would operate may best be described in conjunction with FIG. 2, where elements or blocks like those shown in FIG. 1, are designated by like numerals. That is, the incoming encoded message 10 is operated upon by the first root matrix $R_1$ represented by the matrix in block 16. The correlation results are represented in block 18. Then these correlation results are operated upon by a second root matrix $R_2$ identical with $R_1$ and shown in block 20. The final correlation results are those shown in block 14, which are identical with those shown in block 14 of FIG. 1.

Though such a theoretical approach seems to suggest that the decoder's operation may be simplified, attempts to construct a relatively simple decoder, capable of performing the successive correlations as outlined in FIG. 2 have failed. It is to provide a relatively simple decoder, capable of performing the necessary decoding operation, that the present invention is directed to.

The principles of operation of the decoder of the present invention are based on the provable theorem that the symmetrical square matrix of +1 and −1 entries H*n* may be expressed in terms of the product of *n* unique matrices M where $$H_n = \prod_{i=1}^{n} M_n^{(i)} \quad (3)$$

and $$M_n^{(i)} \triangleq I_{n-i} \otimes H_1 \otimes I_{i-1} \quad (4)$$

where $$H_1 \triangleq \begin{bmatrix} 1 & 1 \\ 1 & -1 \end{bmatrix},$$

⊗ is the symbol for the Kronecker Product and I is the identity matrix.

For the four by four matrix (block 12, FIG. 1) in which *n* is equal to 2, ($n = \log_2 4$), the matrix may be expressed in terms of the product of the following two matrices:

$$M_2^{(1)} = I_{2-1} \otimes H_1 \otimes I_{1-1} = I_1 \otimes H_1 \otimes I_0$$
$$= \begin{bmatrix} 1 & 1 \\ 0 & 1 \end{bmatrix} \otimes \begin{bmatrix} 1 & 1 \\ 1 & -1 \end{bmatrix} \otimes 1$$
$$= \begin{matrix} 1 & 1 & 0 & 0 \\ 1 & -1 & 0 & 0 \\ 0 & 0 & 1 & 1 \\ 0 & 0 & 1 & -1 \end{matrix} \quad (5)$$

$$M_2^{(2)} = I_{2-2} \otimes H_1 \otimes I_{2-1}$$
$$= I_0 \otimes H_1 \otimes I_1$$
$$= 1 \otimes \begin{bmatrix} 1 & 1 \\ 1 & -1 \end{bmatrix} \otimes \begin{bmatrix} 1 & 0 \\ 0 & 1 \end{bmatrix}$$
$$= \begin{matrix} 1 & 0 & 1 & 0 \\ 0 & 1 & 0 & 1 \\ 1 & 0 & -1 & 0 \\ 0 & 1 & 0 & -1 \end{matrix} \quad (6)$$

Figure 3:
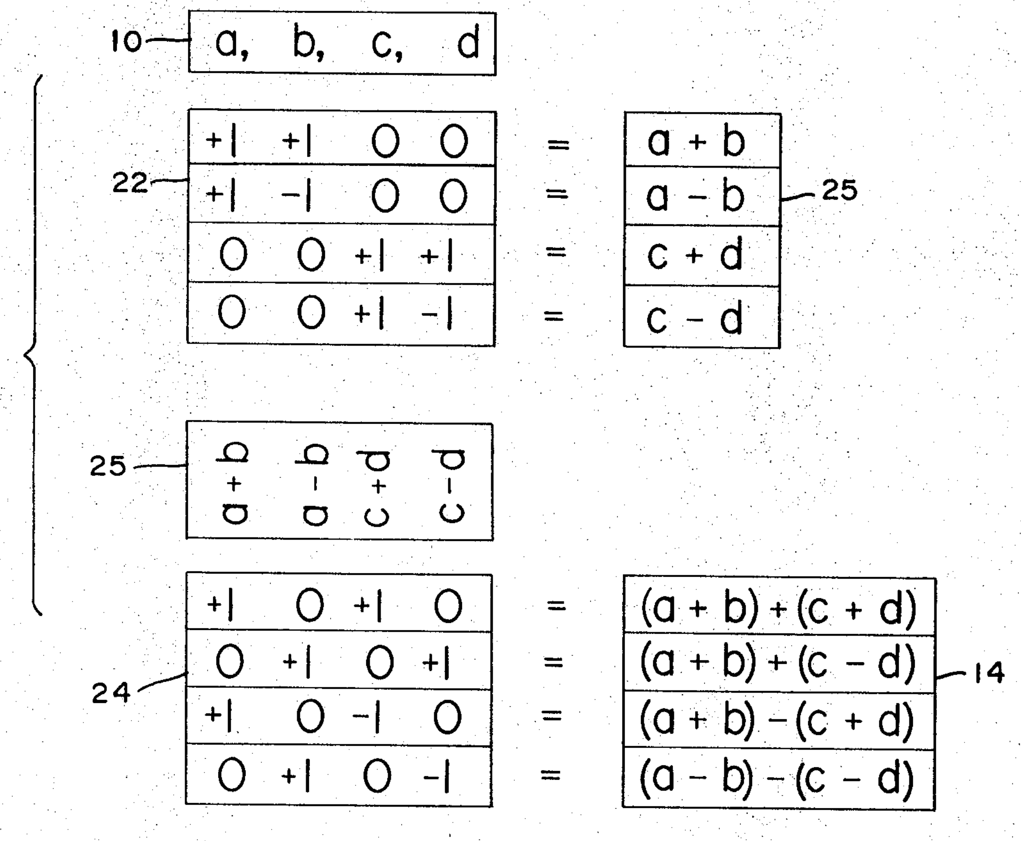
FIG. 3 is a decoding arrangement in accordance with the teaching of the present invention.

The successive correlation operations on the incoming encoded message 10 by these two matrices $M_2^{(1)}$ and $M_2^{(2)}$ are best explained in conjunction with FIG. 3. The latter figure is like FIG. 2, except that the two matrices $M_2^{(1)}$ and $M_2^{(2)}$ are represented by blocks 22 and 24, which are unique rather than identical as in the case with blocks 16 and 20 of FIG. 2. In FIG. 3, numeral 25 represents the result of the correlation of the incoming message 10 by the matrix $M_2^{(1)}$ in block 22.

It has been discovered that the correlation of the encoded message with matrices like $M_2^{(1)}$ and $M_2^{(2)}$ may be easily performed by a decoder consisting of substantially identical modules or stages, the number of which is equal to *n*. Each stage includes a serial memory of a different character storage capacity. The capacity may be generally described as equal to $2^p$ where *p* is 0, 1 . . . ($n-1$). Thus, when $n=2$ two stages are employed, one has a memory with a storage capacity of $2^0=1$ and one stage a storage capacity of $2^{2-1}=2^1=2$. If *n* were equal to three, the three stages would have memories with storage capacities of 1, 2 and 4 characters.

Figure 4:
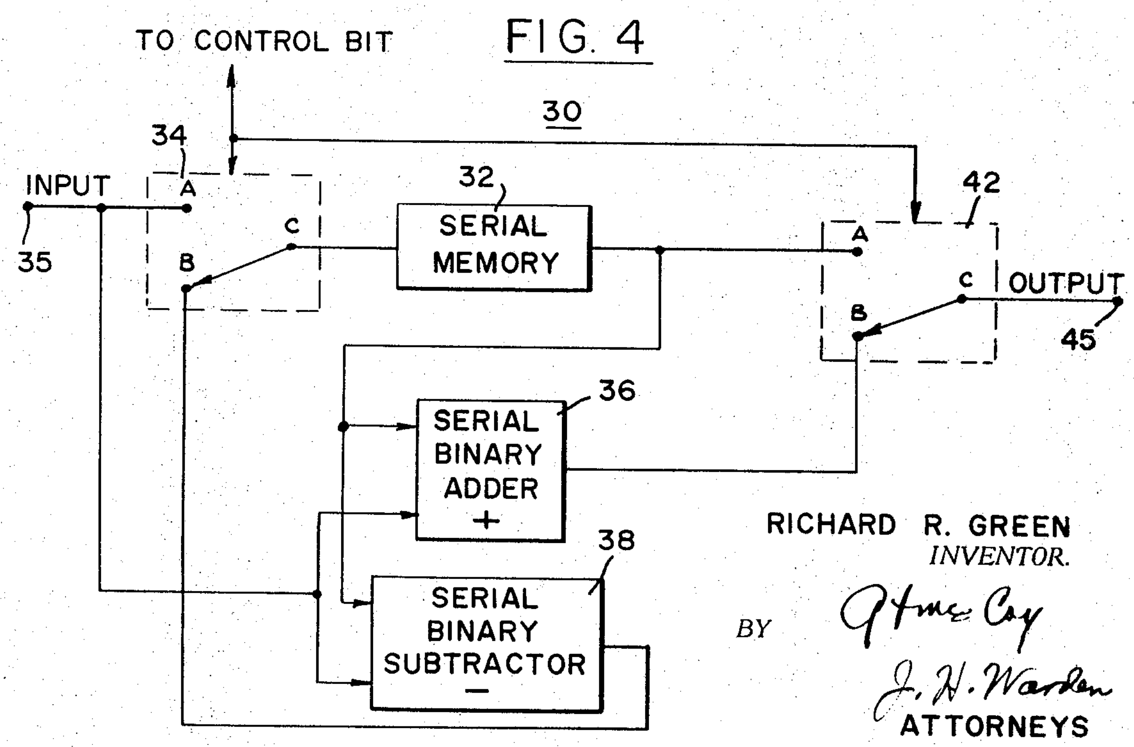
FIG. 4 is a basic stage of the novel decoder of the present invention.

Reference is now directed to FIG. 4, which is a simplified block diagram of the basic module or stage of the demodulator of the present invention. The module 30 comprises a serial memory 32, whose input is connected to a common terminal C of a logic switch 34. Terminal A of switch 34 is connected to the input terminal 35 of module 30. The latter terminal is also connected to one input of a serial binary adder 36 and one input of a serial binary subtractor 38. The output of subtractor 38 is connected to the B terminal of switch 34.

The module 30 further includes a second logic switch 42, whose common terminal C is connected to the module's output terminal 45, while the A and B terminals of switch 42 are respectively connected to the outputs of memory 32 and adder 36.

Switches 34 and 42 are controlled by a control bit of a control counter to be described later. When the control bit is in one state, such as a "0," the switches are in the B position (as diagrammed) while being switched to the A portion when the control bit is in state "1." As previously indicated, the character storage capacity of memory 32 differs from module to module, being equal to any one of $2^0$, $2^1$ . . . $2^{(n-1)}$.

Figure 5:
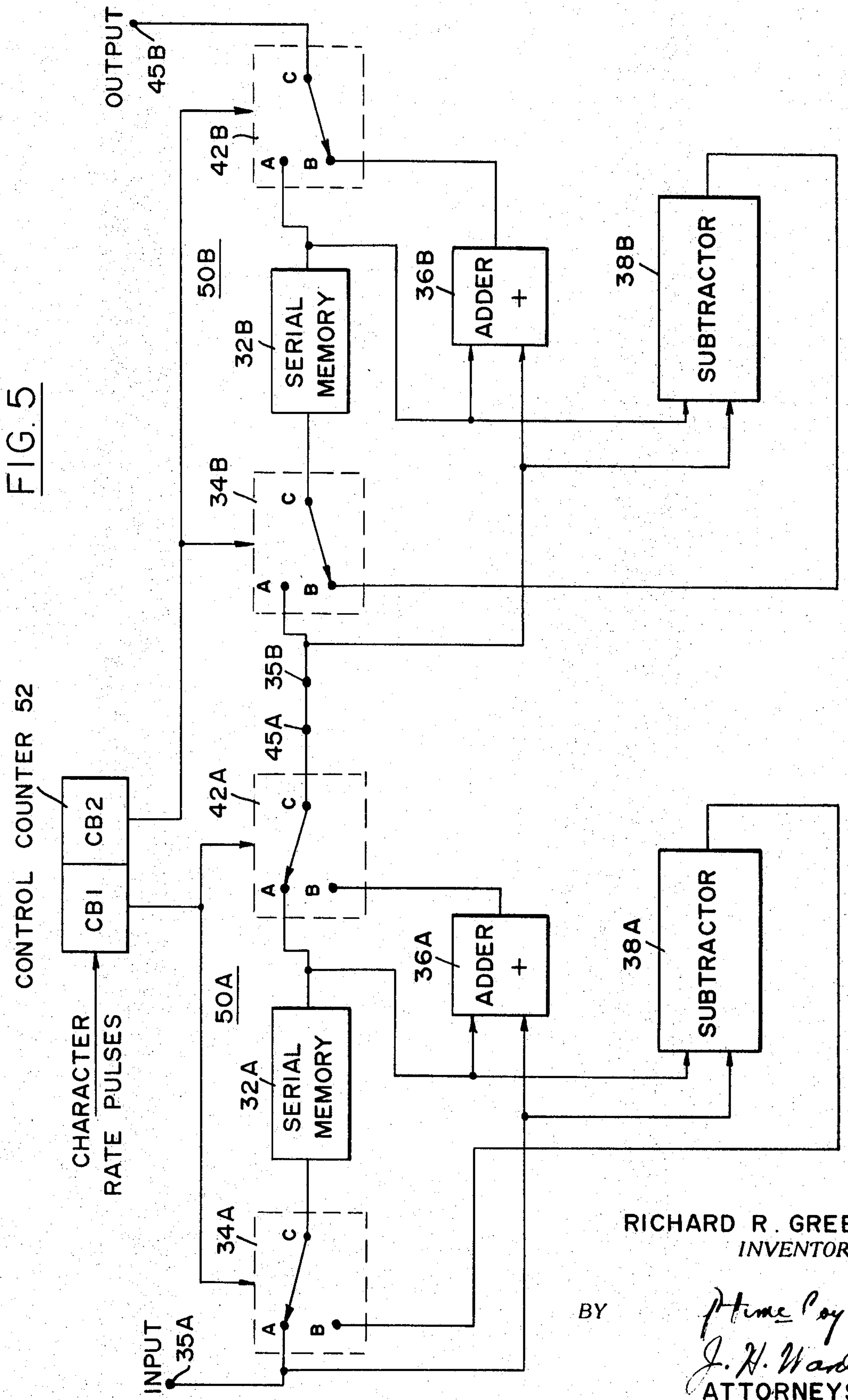
FIG. 5 is a diagram of a 2-stage decoder, necessary to provide the decoding arrangement, shown in FIG. 3.

The decoder of the invention is implemented by connecting the modules in a sequence with the input terminal of one module directly connected to the output terminal of a preceding module. The input and output terminals of the first and last modules serve as the input and output terminals of the decoder. For the foregoing described example where $n=2$, two modules or stages are required. Such an arrangement is shown in FIG. 5 to which reference is made herein. Therein the two stages are designated 50A and 50B with the numbers of the circuits consisting of each stage ending with the stage's letter designation.

In addition, a 2-bit control counter 52 is diagrammed. Control bit CB1 is connected to control switches 34A and 42A, while CB2 controls switches 34B and 42B. The count of counter 52 is incremented by pulses, supplied at the character reception rate. Memory 32A is assumed to have a storage capacity of $2^0=1$ character while memory 32B has a capacity of $2^1=2$ characters. However, it has been found that the first stage 50A may have a storage capacity of 2 and stage 50B a capacity of 1 character without effecting the demodulator's performance. Thus, the order of the stages in the sequence is not significant.

The operation of the two-stage demodulator may best be exemplified in conjunction with the encoded message *a*, *b*, *c* and *d*, assumed to be generally supplied during a sequence of character rate pulses numerically represented in the left-hand column of FIG. 6. Rate pulse 1 sets the control bits CB1 and CB2 to states 1 and 0, respectively, so that the switches in stages 50A and 50B are in positions A and B, respectively. During the period of character rate pulse 1, the first digital character *a* of the encoded message is supplied to input terminal 35A. Since switch 34A is in the A position, it is supplied and stored in the 1-character serial memory 32A.

During the period of subsequent character rate pulse 2, the switches of stages 50A and 50B are in states B and A, respectively. At the same time, the character *b* is supplied to terminal 35A and the *a* character is read out from memory 32A. Adder 36A adds $a+b$ the value of which is supplied to memory 32B through switch 42A in position B and switch 34B in position A. Also, at the same time, subtractor 38A subtracts *b* from *a* and through switch 34A in position B supplies it for storage in memory 32A. Thus at the end of the period of pulse 2, $a+b$ is stored in memory 32B and $a-b$ in memory 32A.

During the period of pulse 3 all the switches are in the A position. The character *c* of the encoded message is supplied to terminal 35A and through switch 34A it is stored in memory 32A. Simultaneously, $a-b$ is read out from memory 32A and through switches 42A and 34A it is supplied for storage in memory 32B.

During the period of pulse 4, all the switches are in position B and the *d* character is supplied to the decoder, while the *c* character is read out from memory 32A. Subcontractor 38A subtracts *d* from *c* $(c-d)$ which through switch 34A is stored in 32A. Also, adder 36A adds *d* to *c*, $(c+d)$ which is supplied through switch 42A to terminals 45A and 35B.. At the same time, $a+b$, the first value stored in memory 32B is read out. Both $a+b$ and $c+d$ are supplied to adder 36B which supplies the total value of $a+b+c+d$ to the output terminal 45B through switch 42B. Thus, the first value is produced at the decoder's output. The other three values are produced during the periods of successive character rate pulses 5, 6 and 7, as summarized in the last three rows of FIG. 6.

From the foregoing description, it should thus be appreciated that the two-stage decoder diagrammed in FIG. 5 correlates the four-character encoded message *a*, *b*, *c* and *d* with each of the code words in the $2^2 \times 2^2$ matrix shown in block 12 of FIG. 1.

The two stages are identical except for the storage capacities of memories 32A and 32B. Each stage is constructable with circuits well-known in the art, thus producing a relatively simple decoder.

The modular characteristic of the decoder is particularly significant since larger matrices can be easily accommodated by the addition of stages. For example, an eight by eight $(2^3 \times 2^3)$ matrix can be accommodated by the use of three stages. The maximum storage capacity required to accommodate a matrix of $2^n$ by $2^n$ is $2^{(n-1)}$. Thus, the maximum required storage capacity is less than the number of characters in any code word.

There has accordingly been shown and described herein a novel modular serial digital decoder. It decodes a message decoded with a code word from a square $2^n \times 2^n$ symmetrical matrix with entries of $+1$ and $-1$ in *n* substantially identical stages.

It is appreciated that those familiar with the art may make modifications and/or substitute equivalents in the arrangement as shown without departing from the spirit of the invention. Therefore, all such modifications and/or equivalents are deemed to fall within the scope of the invention as claimed in the appended claims.

What is claimed is:

1. A serial decoder comprising:

*n* decoder stages connected in sequence, each stage including;

a first and second logic switches each switchable between a first position and a second position, and having a common terminal and first and second terminals, whereby said common terminal is in contact with the first terminal when the switch is in the first position and with the second terminal when the switch is in the second position, input and output terminals, a serial adder, means connecting the second and common terminals of said second switch to the output of said adder and to the output terminal respectively, a serial subtractor, means connecting the first and second terminals of said first switch to said input terminal and the output of said subtractor, respectively, a serial memory having an input and an output, means connecting the input of said memory to the common terminal of said first switch and the output of said memory to the first terminal of said second switch and to one input of each of said adder and subtractor, means connecting the input terminal of said stage to another input of each of said adder and subtractor, and means for controlling the positions of said first and second switches.

2. A serial decoder as recited in claim 1 wherein the storage capacity of the serial memory in each stage is equal to $2^m$, where *m* is an integer including zero, and is different for each stage, the maximum *m* being equal to $n-1$.

3. A serial decoder as recited in claim 2 wherein said means for controlling the switch positions comprise an *n* bit binary counter, each bit being connectable to the switches of a different stage for controlling the switches to be in the first or second position when the bit is in a first or a second binary state, respectively.

4. A serial digital decoder for sequentially decoding a multicharacter message encoded by a code from a square symmetrical matrix of +1 and −1 entries comprising:

a plurality of substantially identical stages, each stage including;

a stage input terminal and a stage output terminal, an adder having two input terminals, a subtractor having two input terminals, a serial memory having an input terminal and an output terminal, means connecting the output terminal of said serial memory to one input terminal of each of said adder and subtractor, means connecting the stage input terminal to the other input terminal of each of said adder and subtractor, and means switchable between first and second states, for coupling in the first state the stage input terminal to the input terminal of said memory and the memory output terminal to the stage output terminal and for coupling in the second state the output terminal of said subtractor to the memory input terminal and the output terminal of said adder to the stage output terminal.

5. The serial decoder as recited in claim 4 wherein the size of said matrix $2^n \times 2^n$ and said decoder consists of $n$ stages, and the storage capacity of the memory in each of the said $n$ stages is any one of $2^0, 2^1 \ldots 2^{(n-1)}$.

6. The serial decoder as recited in claim 4 further including state control means for controlling the states of said switchable means.

7. The serial decoder as recited in claim 6 wherein the size of said matrix is $2^n \times 2^n$ and said decoder consists of $n$ stages, said state control means comprises a $n$ bit binary counter and the storage capacity of the memory of each stage differs from those of other memories and is equal to any one of $2^0, 2^1 \ldots 2^{(n-1)}$.

8. A modular serial decoder for decoding a message encoded by a code selected from a $2^n \times 2^n$ symmetrical matrix of +1 and −1 entries comprising:

$n$ serially connected stages with the output of one stage connected to the input of a suceeding stage in the series, each stage including;

a serial memory having input and output terminals, a serial adder having first and second input terminals and an output terminal, a serial subtractor having first and second input terminals and an output terminal, means for connecting said first input terminals of said adder and of said subtractor to said memory output terminal, means for connecting the stage input to the second input terminals of said adder and of said subtractor, and means switchable between first and second states for connecting in the first state the stage input and the stage output to the respective input and output of the memory and for connecting in the second state the outputs of said subtractor and of said adder to the memory input and stage output, respectively.

9. The decoder as recited in claim 8 wherein the capacity of the memory of each stage differing from the memory capacity of any other stage, the memory capacities of the first through the $n$th stage in said series being equal to $2^0, 2^1, 2^2 \ldots 2^{(n-1)}$, respectively.

10. The decoder as recited in claim 9 further including a $n$ bit binary counter, each bit connected to the switchable means in a different stage for controlling the states of the switchable means as a function of the binary value of the bit.

References Cited

UNITED STATES PATENTS

| | | | |
|---|---|---|---|
| 3,378,677 | 4/1968 | Waldecker et al. | 235—168 |
| 3,393,305 | 7/1968 | Purdy et al. | 235—168 |

MAYNARD R. WILBUR, Primary Examiner

J. GLASSMAN, Assistant Examiner